United States Patent [19]

Krieg et al.

[11] Patent Number: 5,041,948
[45] Date of Patent: Aug. 20, 1991

[54] HEAD LAMP FOR MOTOR VEHICLES

[75] Inventors: Wolfgang Krieg, Reutlingen; Walter Weber, Reisensburg, both of Fed. Rep. of Germany

[73] Assignee: Robert Bosch GmbH, Stuttgart, Fed. Rep. of Germany

[21] Appl. No.: 611,182

[22] Filed: Nov. 8, 1990

Related U.S. Application Data

[63] Continuation of Ser. No. 425,046, Oct. 20, 1989, abandoned.

[30] Foreign Application Priority Data

Dec. 21, 1988 [DE] Fed. Rep. of Germany ... 8815840[U]

[51] Int. Cl.$^5$ .............................................. B60Q 1/00
[52] U.S. Cl. ...................................... 362/61; 362/427; 362/284; 362/289
[58] Field of Search .................. 362/61, 80, 418, 427, 362/428, 429, 284, 285, 287; 403/114, 115

[56] References Cited

U.S. PATENT DOCUMENTS 4,293,897 10/1981 Deverrewaere ................... 362/284
4,689,725 8/1987 Saijo et al. ........................... 362/428
4,747,023 5/1988 Ball et al. ............................. 362/282
4,845,598 7/1989 Watanabe et al. ................... 362/418
4,849,860 7/1989 Schauwecker ...................... 362/284

FOREIGN PATENT DOCUMENTS 0313779 5/1989 European Pat. Off. ............. 362/61

Primary Examiner—Ira S. Lazarus
Assistant Examiner—D. M. Cox
Attorney, Agent, or Firm—Michael J. Striker

[57] ABSTRACT

A head lamp for motor vehicle comprising a reflector, an adjusting member for adjusting a reflector position, and an assembly for connecting the adjusting member with the reflector and including a socket that receives a ball portion formed at an end of the adjusting member, and has a hair pin-shaped resilient portion which extends through a sleeve body defined by a reflector connecting portion, and includes an outer surface complementary to a guide surface defined by an inner surface of the sleeve body, and an end having a shoulder thereat that engages a shoulder formed on an end portion of the sleeve body, in the end position of the socket.

5 Claims, 1 Drawing Sheet 5,041,948

HEAD LAMP FOR MOTOR VEHICLES

This is a continuation of application Ser. No. 425,046 filed Oct. 20, 1989 now abandoned.

BACKGROUND OF THE INVENTION

The invention relates to a head lamp for motor vehicles which head lamp comprises a reflector and a ball and socket assembly which enables adjusting of a reflector position and includes an adjusting member having a ball portion at an end thereof and a socket for receiving the ball portion and connected with the reflector. A head lamp of this type is disclosed in DS-OS No. 34 22 446. The reflector of this head lamp includes a socket provided with a sleeve body that interlocks with a stud projecting from the reflector. In this arrangement, a lug formed in the sleeve body interior engages a recess formed on the stud and extending transverse to the axis of the reflector. Such connection between the socket and the reflector is possible only when the reflector is made of a thermoplastic material. When the reflector is made of a thermosetting plastic material by an injection-molding process, it is not possible to form a recess extending transverse to the reflector axis. Moreover, the sleeve is connected to the socket with a radially extending arm and, therefore, when made from a thermoplastic material can be easily twisted.

SUMMARY OF THE INVENTION

The object of the invention is to provide a head lamp with a rigid untwistable connection between the socket and the reflector. The object of the invention is achieved by providing a head lamp in which the reflector includes a sleeve body the inner surface of which defines a guide surface. The end portion of the sleeve body defines a shoulder. The socket, according to the invention, includes a resilient portion that serves as a locking member and is formed as a hair pin extending through the reflector sleeve body and having a surface complementary to the guide surface of the reflector, and a shoulder which extends transverse to the direction in which the adjusting member moves to be locked with the reflector. This shoulder engages the shoulder of the reflector sleeve body in an end position of the socket whereby the socket and thereby the adjusting member interlocks with the reflector. Such a rigid interlocking connection is especially advantageous when the reflector is made of a thermosetting plastic material as no recess extending transverse to the reflector axis is needed.

The invention both as to its construction so to its method of operation, together with additional objects and advantages thereof, will be best understood from the following detailed description of specific embodiments when read in connection with the accompanying drawing.

DESCRIPTION OF THE PREFERRED EMBODIMENTS

Figure 1:
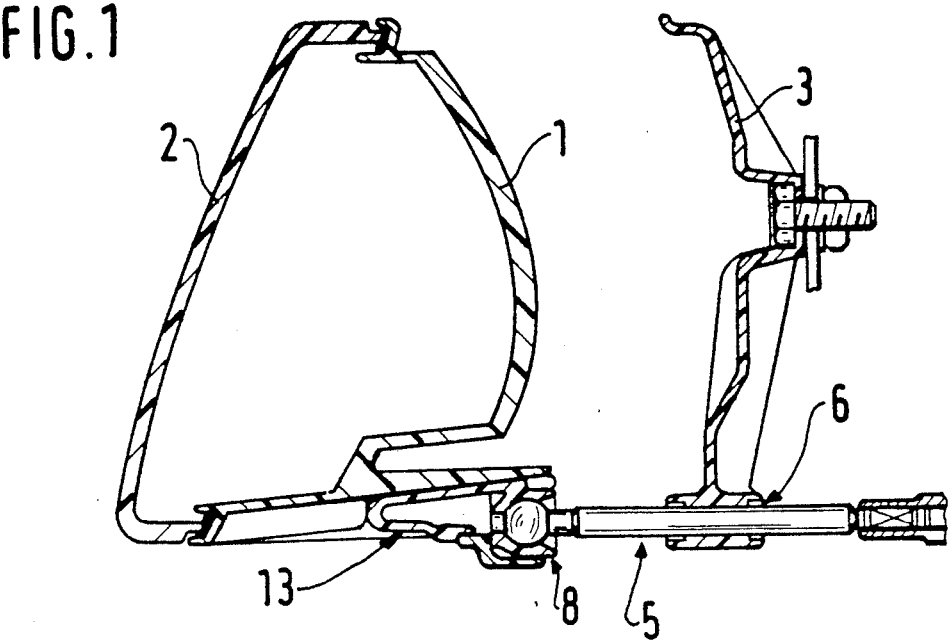
FIG. 1 shows a longitudinal cross-sectional view of a vehicle head lamp according to the invention.
Figure 2:
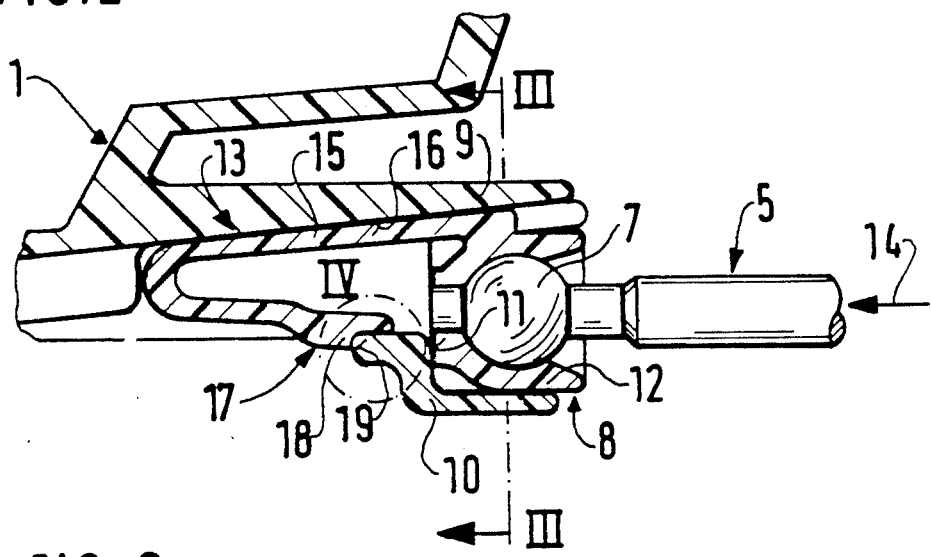
FIG. 2 shows a longitudinal cross-sectional view of the ball and socket assembly of the head lamp of FIG. 1.

A vehicle head lamp shown in FIG. 1 comprises a reflector connected with a head lamp lens 2 and an associated housing portion 2. The reflector is preferably made of a thermosetting plastic material. An adjusting member 5 provides for angular positioning of the reflector 1. A bushing 6 movably supports the adjusting member 5 in the housing portion 3. The adjusting member 5 has at an end thereof a ball portion 7 by which the adjusting member 5 is connected with the reflector 1. The ball portion 7 is received in a socket 8 connected with the reflector 1.

Figure 3:
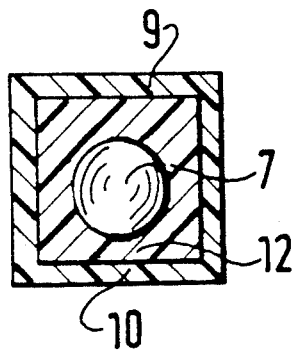
FIG. 3 shows a cross-sectional view of the ball-socket assembly along line III—III in FIG. 2.

The reflector 1 has a projection 9 at an end of which a sleeve body 10 for receiving the socket 8 is formed. As shown in FIG. 3, the cross-section of the sleeve body 10 taken transverse to the longitudinal axis thereof, represents a rectangle one side of which is formed by the projection 9. The inner surface of the sleeve body 10 has a step 11 facing the adjusting member 5. The socket 8 comprises a rectangular base 12 and, formed integrally therewith, a resilient portion 13 arranged adjacent to the reflector 1. The resilient portion 13 has a hair-pin shape. A leg 15 of the portion 13, which extends in a direction 14 of the linear movement of the adjusting member 5 in which the adjusting member moves to be interlocked with the reflector, has an outer surface adapted to slide along a guide surface 16 on the projection 9. The base 12 engages the step 11. The resilient portion 13, in its end region 17, has an extension 18. The extension 18 has at an end thereof a cut-out portion having a surface that extends transverse to the direction 14 of linear movement of the adjusting member and defines a shoulder that engages a shoulder 19 formed on an end portion of the sleeve body 10 and also extending in a direction transverse to the direction 14. The end portion of the sleeve body 10 has an inner surface located adjacent to the shoulder 19 and extending in the direction 14. The cut-out portion at the end of the extension 18 has adjacent to the shoulder of the cut-out portion a surface extending in the direction 14 and which overlies the inner surface of the end portion of the sleeve body which is located adjacent to the shoulder.

To connect the socket 8 with the reflector 1, the socket 8 is pushed in the direction 14. Upon attaining a predetermined end position of the socket, the base 12 engages the step 11 formed on the inner surface of the sleeve body 10. At the same time, the portion 13, because of its resiliency, expands in the direction transverse to the direction 14 and the shoulder formed by the cut-out portion at the end of the extension 18 engages the shoulder 19 of the end portion of the sleeve body 10. The surface of the cut-out portion which extends adjacent to the shoulder formed at the cut-out portion overlies and abuts the inner surface of the sleeve body end portion and which extends adjacent to the shoulder 19. In this manner, the socket 8 becomes interlocked with the sleeve body 10.

Figure 4:
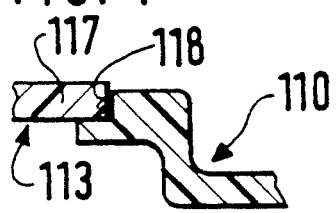
FIG. 4 shows a modification of a portion of the ball and socket assembly of FIG. 2 which is designated as IV.

In an embodiment shown in FIG. 4, the sleeve body 110, on its side facing the reflector 1, has a ledge 118 which is engaged by an end surface at an end portion 117 of the resilient portion 113. The end portion 117 of the portion 13 has, adjacent to the end surface thereof, a surface which extends in the direction 14 and overlies an inner surface of the ledge 118 of the sleeve body 110 which extends in the direction 14.

While the invention has been illustrated and described as embodied in a motor vehicle head lamp, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A head lamp for motor vehicles, comprising a reflector having a reflector connecting portion; a member for adjusting a reflector position and having a ball portion at an end thereof and a longitudinal axis along which said adjusting member moves to be fixedly connected with said reflector connecting portion; and means for connecting said adjusting member with said reflector connecting portion, said reflector connecting portion comprising a sleeve body having an inner surface defining a guide surface extending substantially in a direction of axial movement of said adjusting member, and an end portion defining a shoulder, said connecting means comprising a hair pin-shaped resilient member extending through said sleeve body and having an outer surface which is complementary to said guide surface, a first arm having a free end, a socket formed at said free end of said first arm for receiving said ball portion of said adjusting member, and a second arm having a free end provided with a shoulder for resiliently engaging said shoulder at said end portion of said sleeve body along a surface which extends transverse to the direction of the axial movement of said adjusting member, in an end position of said socket, whereby said adjusting member fixedly interlocks with said reflector connecting portion, said free end of said second arm including an extension on which said engaging shoulder is formed and which has a surface that overlies and abuts a surface on said end portion of said sleeve body at the end position of said socket.

2. A head lamp as defined in claim 1, wherein said sleeve body has a rectangular cross-section having a projection portion defining said guide surface, and another portion that extends parallel to and in spaced relationship with said projection portion and defines said end portion of said sleeve body, said hair pin-shaped resilient portion having a first leg on which said outer surface is formed, and a second leg defining said end of said hair pin-shaped resilient member.

3. A head lamp as defined in claim 2, wherein said socket has a base having a rectangular cross-section which is complementary to the rectangular cross-section of said sleeve body, said hair pin-shaped resilient portion projecting from said base.

4. A head lamp as defined in claim 1, wherein said sleeve body has a step formed in an interior thereof, said socket having an end surface that engages said step at the end position of said socket.

5. A head lamp as defined in claim 1, wherein said reflector is made of a thermosetting plastic material.

* * * * *